US005566450A

United States Patent [19]

Rao et al.

[11] Patent Number: 5,566,450

[45] Date of Patent: Oct. 22, 1996

[54] FLEXIBLY MAKING ENGINE BLOCK ASSEMBLIES

[75] Inventors: V. Durga Nageswar Rao, Bloomfield Township; Robert A. Rose, Grosse Pointe Park; David A. Yeager, Plymouth; Daniel M. Kabat, Oxford, all of Mich.

[73] Assignee: Ford Motor Company, Dearborn, Mich.

[21] Appl. No.: 407,524

[22] Filed: Mar. 16, 1995

[51] Int. Cl.[6] .................... B23P 15/00

[52] U.S. Cl. .................... 29/888.061; 29/888.06; 29/888

[58] Field of Search .................... 29/888.061, 888.06, 29/428, 888, 445, 458, 460, 527.3, 527.4; 123/193.2

[56] References Cited

U.S. PATENT DOCUMENTS

| | | | |
|---|---|---|---|
| 991,404 | 5/1911 | Woodworth . | |
| 1,347,476 | 7/1920 | Allyne . | |
| 3,620,137 | 11/1971 | Prasse . | |
| 4,370,788 | 2/1983 | Baker | 29/888.061 |
| 4,393,821 | 7/1983 | Urano | 123/668 |
| 4,495,907 | 1/1985 | Kamo . | |
| 5,005,469 | 4/1991 | Ohta | 29/888.061 |
| 5,255,433 | 10/1993 | Jin et al. | 29/888.061 |
| 5,291,862 | 3/1994 | Katoh et al. | 123/193.2 |
| 5,315,970 | 5/1994 | Rao et al. . | |
| 5,320,158 | 7/1994 | Helgesen | 29/888.061 |
| 5,363,821 | 11/1994 | Rao et al. | 123/193.2 |
| 5,419,037 | 5/1995 | Bailey | 29/888.061 |

FOREIGN PATENT DOCUMENTS

| | | |
|---|---|---|
| 53-41621 | 4/1978 | Japan . |
| 60-43150 | 3/1985 | Japan . |

*Primary Examiner*—Irene Cuda
*Attorney, Agent, or Firm*—Joseph W. Malleck

[57] ABSTRACT

A method of flexibly manufacturing engine blocks by first bonding an extruded tube liner insert, of a given thickness (1–15 mm), to a fixed configuration block, the liner insert having been coated with an anti-friction wear-resistant coating having a controlled standard thickness, and secondly bonding an extruded tube liner insert of a different thickness (again selected from 1–15 mm) to another of the fixed configuration blocks, the second liner insert having been coated with the same type of anti-friction wear-resistant coating in essentially the same controlled standard thickness. The common sized engine block can have (i) identically shaped circular cylindrical bore walls or (ii) ovoid cylindrical bore walls with the liner insert having an interior surface shape selection varying between circular to ovoid. The block and liner insert may be both made of aluminum. To promote wear-resistant and lubricant qualities, the coating may contain a mixture of hard particles (such as stainless steel, nickel, chromium or vanadium) and solid lubricant particles such as oxides of iron having controlled oxygen, BN, LiF, $NaF_2$ or a eutectic of $LiF/NaF_2$.

10 Claims, 6 Drawing Sheets

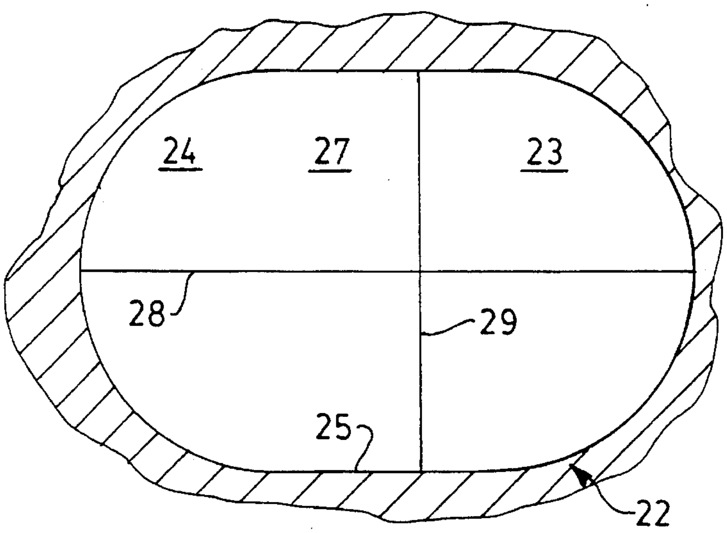
FIG-11
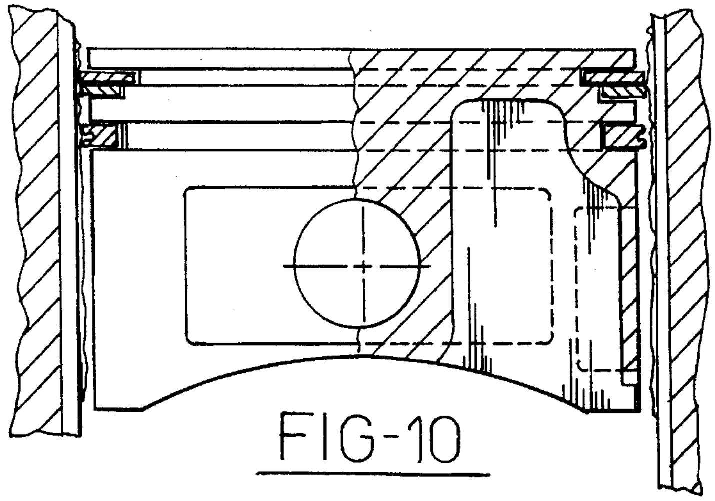
FIG-10
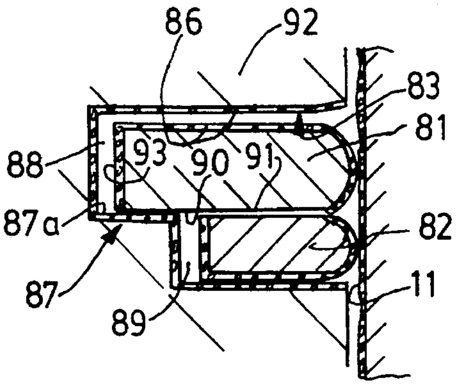
FIG-12
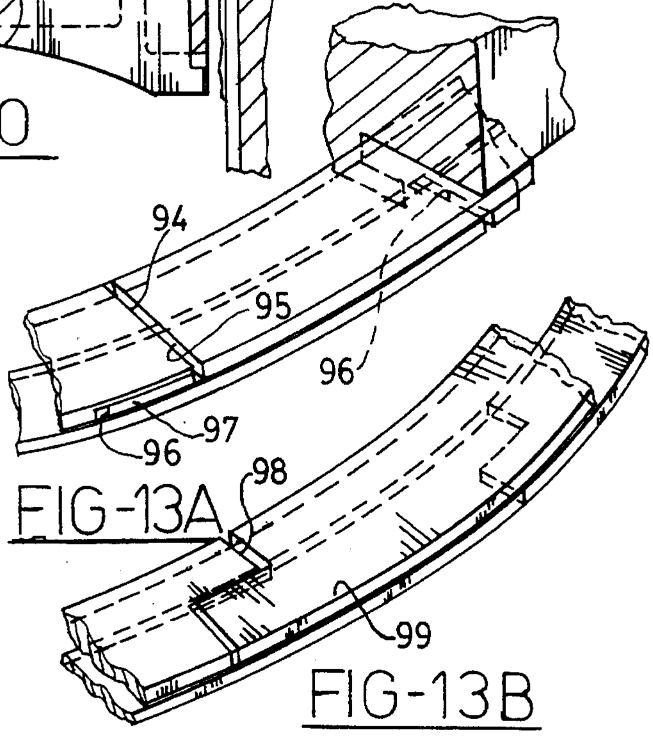
FIG-13A
FIG-13B

FLEXIBLY MAKING ENGINE BLOCK ASSEMBLIES

BACKGROUND OF THE INVENTION

1. Technical Field

This invention relates to the technology of improving engine block bore surface performance by use of liner inserts, and more particularly to interiorly coated liner inserts that can be varied in wall thickness to create a different engine displacement design.

2. Discussion of the Prior Art

As early as 1911, cast iron engine blocks have been made with relatively thick iron cylinder liner inserts, sometimes coated interiorly with nickel. When engine blocks were eventually made of aluminum to reduce weight and improve thermal-conductivity, the liner inserts continued to be relatively thick iron for durability. Extensive machining was necessary to true the shape of the inner surface of the liner inserts after they were installed, usually by press fitting. Such liner inserts were either uncoated or coated to increase wear-resistance; but more importantly, the inserts continued to be dedicated to a standard thickness facilitating only a single engine design.

The prior art failed to achieve greater economy in block-liner fabrication; such lack of economy is associated with repetitive machining to restore shape to the coated cylinder bore, and inability to provide flexibly designed assemblies not dedicated to a single design. It is therefore an object of this invention to flexibly manufacture engine blocks that utilize liner inserts in a way that is more economical, provides changeable volume capacity for the engine cylinders, and reduces the steps needed to employ anti-friction coatings thereon that are stable and yet operate with a variety of fuels used by modern engines.

SUMMARY OF THE INVENTION

The invention is a method of flexibly manufacturing engine blocks by first bonding extruded tube liners, of a given thickness, to the bore walls of a fixed configuration block, the liner having been coated with a wear-resistant anti-friction coating having a controlled standard thickness, and secondly bonding extruded tube liners of a different wall thickness to the bore walls of another of the fixed configuration blocks, the second liners again having been coated with the same type of wear-resistant anti-friction coating in the same controlled standard thickness.

More particularly the method comprises: (a) making at least first and second engine blocks with commonly sized cylinder bore walls; (b) preparing a set of first liner inserts for the first block from extruded tubing and a set of second liner inserts for the second liner inserts for the second block from other extruding tubing, each set of liner inserts having a different wall thickness resulting from selecting extruded tubing of a different wall thickness in the range of 1–15 mm; (c) implanting the set of first liner inserts into the first block and the set of second liner inserts into the second block, said implanting being with a fit that promotes thermal conductivity across the face between said inserts and bore wall; and (d) applying an adherent anti-friction wear-resistant coating to at least a zone of the interior of each liner insert, said coating being controlled as to uniform thickness, concentricity, and trueness to the operating axes of said engine blocks, said coating being applied either prior to or subsequent to said implanting.

The common sized engine blocks may have identically shaped circular cylindrical bore walls with the variable selection of the wall thickness of said extruded tubing correlating to a cylinder volume displacement change of as much as 100%; or the making of the engine blocks may be with ovoid cross-sectional cylindrical shapes, the selection of the ratio of the major to minor axis of such ovoid cross-sectional shape being in the range of 1.0 to 1.35, the engine blocks having a crankshaft axis with the minor axis of the ovoid shape being parallel to the plane of such crankshaft axis, the extruded tubing having an outer surface complementary to the ovoid shape and having an interior surface the selection of which varies between the circular shape to the ovoid shape, the design variation in the extruded tubing wall correlating to a cylinder volume displacement change of as much as 150%.

To promote ease of fabrication and consistent thermal expansion and thermal conductivity characteristics, the block and liner inserts are both made of aluminum. To promote wear-resistance and lubricant qualities, the coating contains a mixture of hard particles (such as steel, stainless steel, nickel, chromium or vanadium) and solid lubricant particles such as oxides of iron having controlled oxygen, BN, LiF, $NaF_2$ or a eutectic of $LiF/NaF_2$.

BRIEF DESCRIPTION OF THE DRAWINGS

FIG. 3 depicts the bore surface substrate in a washed and degreased condition; FIG. 4 depicts the aluminum substrate bore surface after it has been subjected to a treatment for exposing fresh metal; FIG. 5 depicts the coating system as applied to the exposed fresh metal surface showing a topcoat and a bottom coat; and FIG. 6 depicts the coating system of FIG. 5 after it has been honed and finished to size;

FIG. 10 is an enlarged view of the piston of FIG. 9;

FIG. 11 is a top view of FIG. 10;

FIG. 12 is a still further enlarged view of a portion of FIG. 10; and

FIGS. 13A and 13B are each fragmentary perspective views of the dual piston rings used in FIG. 10, each figure illustrating a different end gap configuration.

DETAILED DESCRIPTION AND BEST MODE

Figure 1:
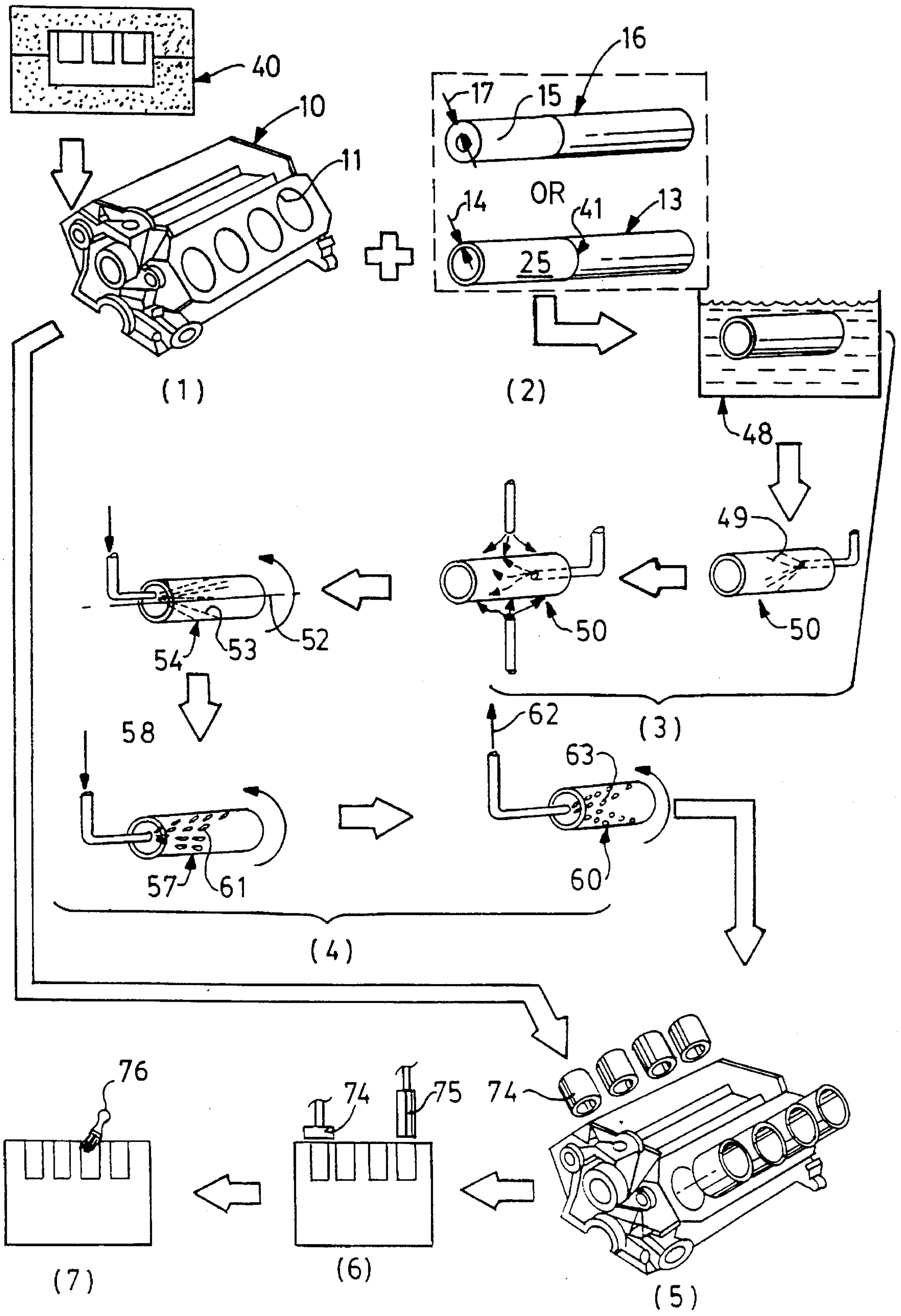
FIG. 1 is a flow diagram of the best mode method of this invention.

As shown in FIG. 1, the concept of this invention is to employ sections of extruded tubing as liners for insertion into cylinder bore walls of engine blocks. This invention has discovered that the thickness of the liner insert can be related to engine displacement increments; the thickness of the liner inserts, optionally supplemented by increasing the major axis of the bore cross-section, can importantly achieve different displacements using the same engine block while producing a different engine.

Figure 2A:
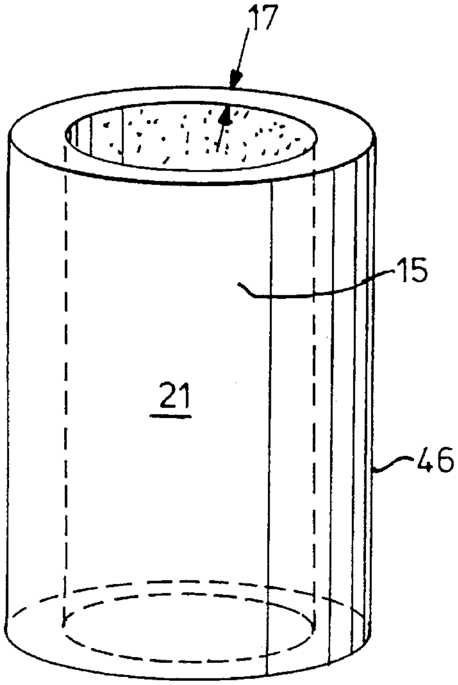
FIGS. 2A and 2B are side-by-side figures which visually compare the wall thickness of two circular cylindrical liner inserts shown in perspective elevation, illustrating the changes in interior volume effected by a change in wall thickness and without affecting the exterior shape.
Figure 2B:
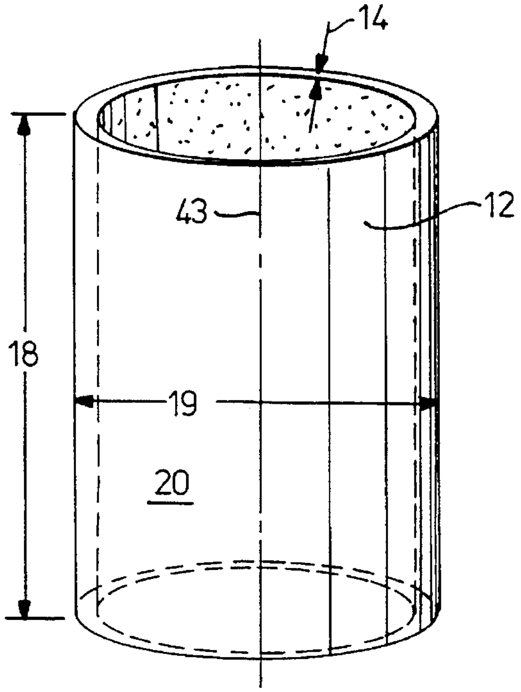

Referring briefly to FIG. 1, the essential steps comprise (1) casting metallic engine blocks 10 of a fixed configuration with a plurality of cylinder bores 11, (2) cutting a set of metallic liner inserts 12 from a first extruded tubing 13 (with a given thickness 14) for each of the cylinder bores 11 of a first engine block, and following steps (3)–(4) involving cleaning of the liner inserts, exposing fresh metal, undercoating and topcoating while rotating the liners, and then (5) implanting the set of coated liner inserts 12 into cylinder bores 11 of the first engine block, and (6) optionally honing the interior coating and (7) optionally coating the honed interior coating with an abradable coating that can effect essentially zero clearance. This creates one engine block of a first cylinder displacement volume. To create another engine block with a different displacement capacity, a set of second liner inserts 15 is cut from extruded tubing 16 (having a different wall thickness 17) for defining inserts for each of the cylinder bores 11 of another engine block of the same fixed configuration, and again following steps (3) through (7) as above to coat and install such second liners 15 in the second engine block. The use of differing insert wall thicknesses to achieve a variation in engine displacement volume for a fixed designed block, is unique in a first aspect. The displacement volume ($\pi D^2/4 \cdot L$), for a circular cylindrical bore, can be significantly affected by controlling insert wall thickness. For example, as shown in FIG. 2B, if the extruded wall thickness 14 is 1.0 mm, the bore diameter 19 is 8 cm, the insert bore length or bore stroke (18) is 8 cm, then the displacement volume 20 will be about 3.2 liters for a V-8 engine and 2.4 liters for a V-6. If, as shown in 2(*a*), the extruded insert 15 wall thickness 17 is 10 mm, the bore diameter the same, the insert length (18) is the same, then the displacement volume 21 will be about 2.1 liters for a V-8 and about 1.6 liters for a V-6. The variation in displacement volume from 2.1 liters to 3.2 liters permits a V-8 type engine to have a wide range of designed horsepower. This permits significant design flexibility without changing any design aspect of the dedicated engine block except the thickness of the insert wall. It should be noted that radii and wall thicknesses are exaggerated in FIGS. 2A–2D to illustrate the change point.

Such displacement flexibility can be further enhanced by casting the fixed configuration block with an ovoid type cross-section 22 for the cylinder bores. As shown in FIG. 11, the cross-section 22 would essentially consist of two half circles 23,24 (consistent with a normal circular bore) spaced apart by a pair of small incremental straight sides 25,56, thereby forming a rectangle 27 between the two half circles. Such spacing creates a major axis 28 and a minor axis 29 for the cross-sectional ovoid. If the ratio of the major axis to the minor axis is controlled within the range of 1.0 to 1.35 for the cylinder bore, the liner insert can be varied in wall thickness in another way. The extruded tubing must have an outside surface complementary to the cylinder bore ovoid shape but the interior surface can range from a circular shape to progressive ovoids in cross-section. The critical control thickness of the insert will be that adjacent the straight sides 26,25. When the thickness of this critical part is changed, the displacement volume will be changed, but to a greater degree because leverage can be obtained by making the insert interior more ovoid.

Figure 2C:
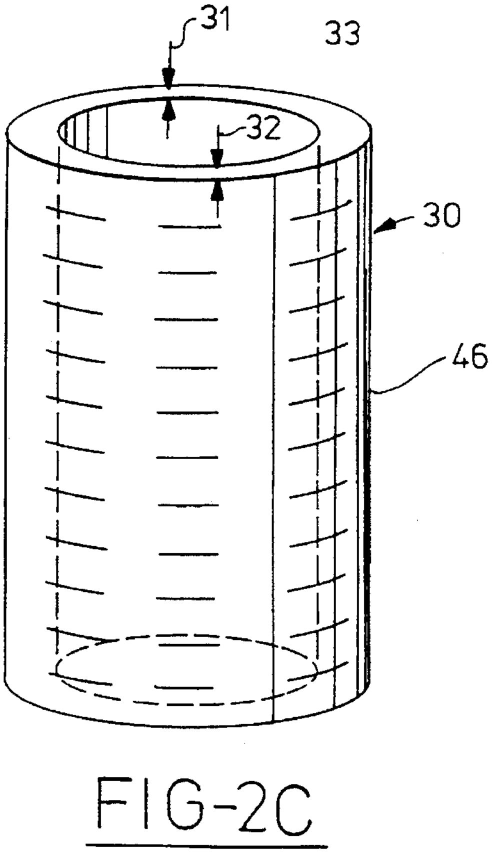
FIGS. 2C and 2D are side-by-side figures which visually compare the wall thickness of inserts having an external ovoid shape.
Figure 2D:
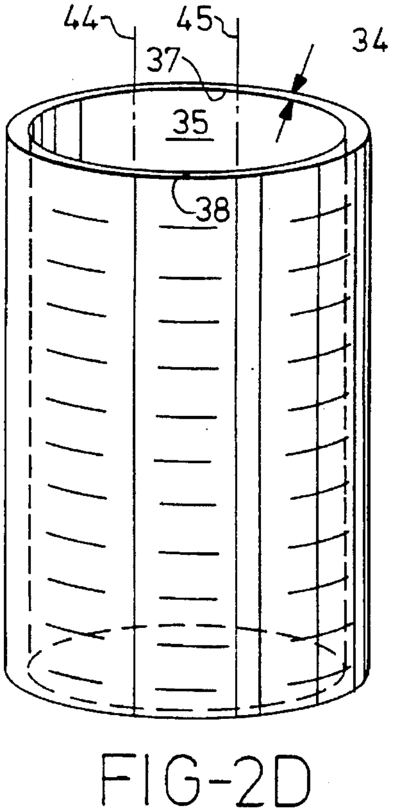

For example, as shown in FIG. 2C, if the cylinder bore ovoid has a major axis of 1.2 times the minor axis, then the displacement volume for the interior of a liner insert 30 with a circular interior 3, will be $$\frac{\pi D^3}{4} + .2D^3,$$

where D is the internal diameter of the round surface. If the wall thickness at 31,32 is about 1.0 mm, D is about 8 cm, and the liner length is 8 cm, then the displacement volume 36 will be as above, 3.2 liters for a V-8 and 2.4 liters for a V-6. But if the interior extruded cross-section of the liner is changed to an ovoid as in 2D, similar to its exterior, with a uniform wall thickness 34 of about 1.0 mm, then the displacement volume 35 for a V-8 engine will be 4.0 liters and 3.0 liters for a V-6, considerably greater than the 3.2 and 2.4 liters of a circular bore above. If the wall thickness at 37,38 is increased to 10 mm, then the displacement volume will be reduced to 3.1 and 2.2 liters, respectively.

The casting of the engine block can be by sand molding (such as in a mold 40 having appropriate gating to permit uniform metal flow and solidification without undue porosity), shell molding, permanent or semi-permanent molding, die casting, or other commercially acceptable casting technique. Sand molding is advantageous because it provides good product definition with optimum quality and economy for large scale production. The casting process should be controlled in a manner to ensure proper preparation of the metallic surfaces for the eventual coating system by properly controlling the temperature of the molten metal, design of appropriate gating, and by anchoring the sand core so that the bore centers and the cast block will be center to center within ±200 microns of the specified dimension.

Each of the liners is sectioned from a metal (such as aluminum) that is essentially the same as the block (such as aluminum). The liners are sectioned from extruded tubing by high pressure water cutting, such as at 41 or by a process that cuts rapidly without inducing distortion (examples are laser cutting and high speed diamond cutting; but high pressure water cutting is preferred). The tubing desirably has a chemistry of commercial duraluminum 6060 alloy. By virtue of commercially available extrusion technology, the tubing has a wall thickness 14 or 17 accurate to 35 microns ±15 microns over the length of the liner, on its internal/external surfaces and is straight within ±15 microns per foot, with diameters (for curved portions) concentric to within ±15 microns over the length 18 of the liner insert. The cut tubing 12 or 15 need not be precision machined to center its interior surface and assure its concentricity with respect to its intended axis 43 or axes 44,45 in the case of the ovoid; however, the interior surface may be rough honed to remove about 100 microns of aluminum in an effort to present a surface more amenable to receiving a coating. The exterior surface 46 may be smoothed by honing to remove about 20 microns of metal therefrom for the purpose of uniformity, accurate mating with the block bore surface to permit a uniform heat path, and for producing a smoother finish with concentricity required as above.

Just immediately prior to coating, the internal surface 47 of the prepared liner 12 or 15 is preferably cleansed by degreasing (see 48 of FIG. 1), washing by spraying 49 (see 50) and thence air jet drying (see 51). Degreasing is sometimes necessary if the liner by its extrusion technique tends to leave a residue. Degreasing may be carried out without OSHA approved solvents, such as chloromethane or ethylene chloride, followed by rinsing with isopropyl alcohol. The degreasing may be carried out in a vapor form such as in a chamber having a solvent heated to a temperature of 50° F. over its boiling point, but with a cooler upper chamber to permit condensation.

Figure 3:
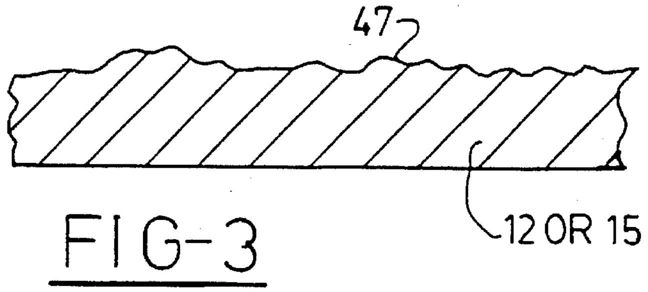
FIGS. 3–6 respectively are greatly enlarged sections of a liner insert substrate that changes its interior surface configuration with respect to the steps of the invention.
Figure 4:
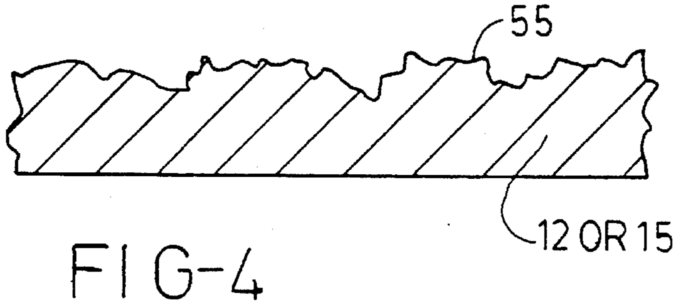

The cleansed liner insert 12 or 15 (having a micro inner surface 47 appearing as shown in FIG. 3) is then fixtured to revolve about a horizontal axis 52. As the liner insert rotates, such as at a speed of 100–400 rpm, the internal surface 47 may first be treated to expose fresh metal, such as by grit (shot) blasting using non-friable aluminum oxide 53 (40 grit size) applied with 15–25 psi pressure (see 54). Alternatively, fresh metal may be exposed by electric discharge erosion, plasma etching with $FCFC_8$ or halogenated hydrocarbons or vapor grit blast (150–325 mesh). With respect to grit blasting, oil-free high pressure air may then be used to eliminate any remnants of the grit. The microsurface 47 appearance is changed by grit blasting, as shown in FIG. 4, to have a rougher contour 55. This step may not be necessary if the tube interior surface is alternatively freshly honed to a desirable texture. In the latter case, minimum time is permitted to elapse before applying the coating.

As the liner revolves a bonding undercoat 56 is desirable applied by thermalspraying 57 (such as by wire arc or by plasma spray). The material 58 of the bond coating is advantageously nickel aluminide, manganese aluminide or iron aluminide (aluminum being present in an amount of about 2–6% by weight). The metals are in a free state in the powder and react in the plasma or arc to produce an exothermic reaction resulting in the formation of inter-metallic compounds. These particles of the inter-metallic compounds adhere to the aluminum substrate surface upon impact of the spray 61 resulting in excellent bond strength. The particles of the bond coat adhere to the aluminum substrate as a result of the high heat of reaction and the energy of impact to present an attractive surface to the topcoat 59 having a highly granular and irregular surface. In some cases the undercoat 56 can be eliminated provided the composition of the topcoat 59 is modified to improve bond strength.

Figure 5:
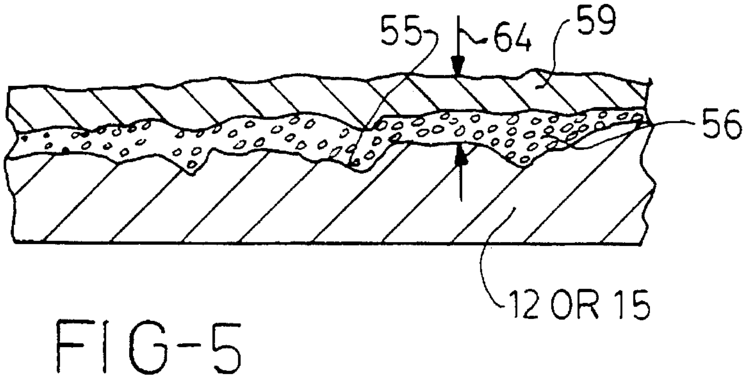
Figure 6:
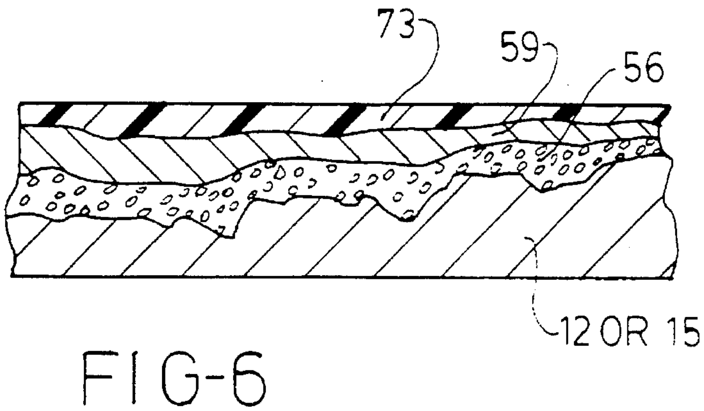

The topcoat 59 is then applied by plasma spraying (see 60). A plasma can be created by an electric arc struck between a tungsten cathode and a nozzle shape copper anode, which partially ionizes molecules of argon and hydrogen gas passed into the chamber of the spray gun by injecting powders 62 axially into the plasma flame. Particles can reach speeds of 600 meters per second before impacting onto a target. The inert gas, such as argon with hydrogen, is propelled into the gun at a pressure of about 5 to 150 psi, and at a temperature of about 30°–100° F. DC voltage is supplied to the cathode of about 12–45 kilowatts while the liner is rotated at a speed of about 200–300 revolutions per minute. The powder feed supply 62 consists of a metalized powder which at least has a shell of metal that is softened (or is an agglomerated composite of fine metal carrying a solid lubricant) during the very quick transient temperature heating in the plasma stream. The skin-softened particles impact on the target surface as the result of the high velocity spray pattern. A major portion of the particles usually have an average particle size in the range of −200+325. The plasma spray 63 can deposit a coating thickness 64 (see FIG. 5) of about 75–200 microns in one pass along the length of the liner insert. Concurrent with the plasma spraying of the internal surface 47, the outside surface 46 of the liner inserts may be cooled with compressed air thereby ensuring an absence of distortion or at least limiting maximum distortion of the wall of the liner to about 15 microns.

Figure 7:
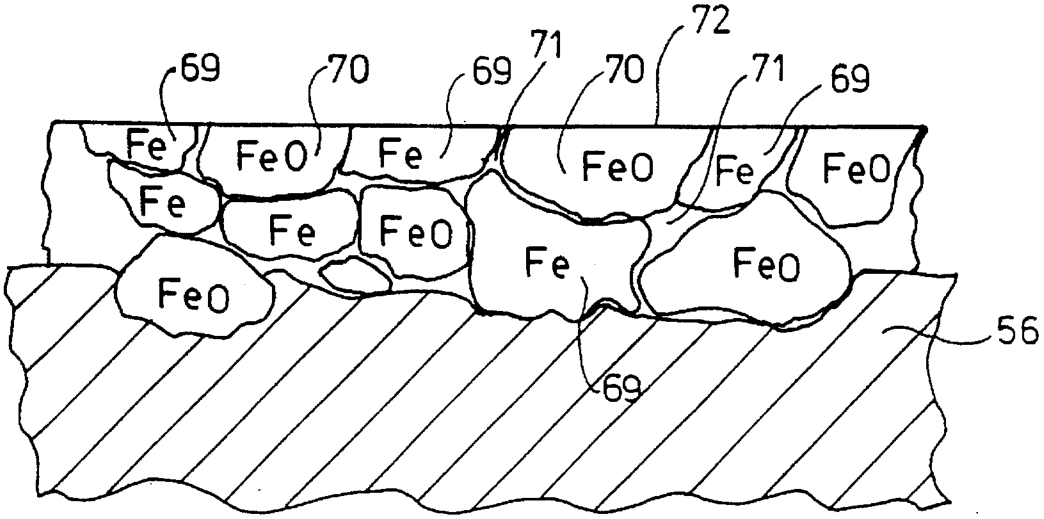
FIG. 7 is a greatly enlarged segment of iron based particles fused in a plasma deposited coating illustrating one form of liner insert coating.
Figure 8:
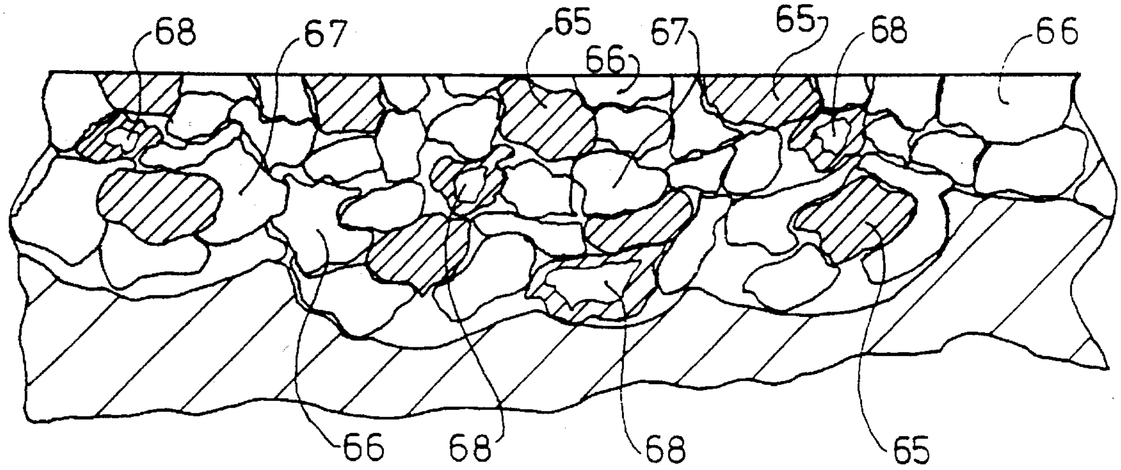
FIG. 8 is a greatly enlarged sketch of different compositional granules fused in a plasma deposited coating, illustrating another form of liner insert coating.

The topcoat 59 powder particles can be, for purposes of this invention, any one of (i) iron or steel particles having an oxide with a low coefficient of dry friction of 0.2–0.35 or less as shown in FIG. 7, (ii) a non-oxide steel or other metal which is mixed with solid lubricant selected from the group consisting of graphite, BN, or eutetics of $LiF/NaF_2$ or $CaF_2/NaF_2$ as shown in FIG. 8; and (iii) metal encapsulated solid lubricants of the type described in (ii). The chemistry of these powders all should present a dry coefficient of friction in the coated form which is less than 0.4 and present a high degree of flowability for purposes of being injected into the plasma spray gun.

If non-oxide metal particles 65 are mixed with solid lubricants, the steel may be of a martensitic type having an alloy content by weight of about 0.1–0.4 carbon, 1–8 manganese, 1–15% chromium, 1–5% nickel and the remainder predominantly iron. The stainless steel particles should preferably contain less than 0.5 carbon by weight and more than 0.5% by weight chromium and 2–4% manganese to be air hardenable upon exposure to air in the deposited form. The hardness of these particles increases from about $R_c$ 45 to 55 as a result of air hardening. The average particle size should not be outside the range of 10–40 microns; if the particle size is lower than 10 microns, it will be too fine and will be difficult to process. If the particle size is greater, such as 60 microns, it will be too course and will not carry an adequate amount of solid lubricant in the composite.

The topcoat solid lubricant particles preferably consist of both boron nitride 66 (which has an oil attracting characteristic and is relatively more expensive) and a eutectic 67 of calcium fluoride and lithium fluoride (which eutectic does, to a moderate extent, has an oil attracting characteristic, but is easier to plasma spray because of its lower melting temperature). A eutectic means the lowest combination of melting temperatures of the mixed ingredients. In a preferable combination, the boron nitride is desirably less than 3% by weight (15% by volume) of the composite. The proportion of LiF is not limited to the eutectic but can range from 10–90% by weight of the solid lubricant. The solid lubricants should have a particle size of about 10–40 microns. If the solid lubricants are combined with nickel, the nickel encapsulated solid lubricant 68 may have solid lubricant in an amount of 30% by volume of the nickel boron nitride. The boron nitride is desirably present in an amount of 25–100% by weight of the solid lubricants.

A binder may be utilized to hold the mixed particles together and should be present in the powder supply 62 in an amount of about 0.5–4% by weight and optimally at about 0.5%. The binder is evaporated by thermalspraying.

The proportion of stainless steel particles to solid lubricant particles can be 60/40 to 85/15, but should preferably be about 75/25. The agglomerated particles should have an average particle size in the range of 40–150 microns.

If the powder particles are of an iron or steel having an oxide form 70, as shown in FIG. 7, the oxygen must be 0.1–0.45% by weight in the oxide form. The particles should preferably consist essentially of a steel grain 69 having a composition consisting essentially of by weight of the material, carbon 0.15–0.85%, an air hardening agent selected from manganese and nickel in a amount of 0.1–6.5%, oxygen in an amount of 0.1–0.45% and the remainder essentially iron. Each grain has a controlled size and fused shape which is flattened as a result of impact upon deposition leaving desirable micropores 71. The honed surface 72 of the coating will expose such micropores. The critical aspect of the steel grains is that it leaves at least 90% by weight of the iron, that is combined with oxygen, in the FeO form 70 only. The steel particle have a hardness of about $R_c$ 20–40, the particle size of about 10–110 microns and a shape generally of irregular granular configuration.

The coefficient of friction for the FeO form 70 of iron oxide is about 0.2. This compares to a dry coefficient of friction of 0.4 for $Fe_3O_4$, of about 0.45 to 0.6 for $Fe_2O_3$, 0.3 for nickel, 0.6 for NiAlSi, 0.3–0.4 for $Cr_2O_3$, and 0.3–0.4 for chromium. It is desirable to produce such oxided steel particle by comminuting a stream of molten sponge iron. Due to the exclusion of air or other oxygen contaminants, the only source of oxygen to unite with the iron in the molten stream is in the steam or water jet used to comminute the stream itself. This limited access to oxygen forces the iron to combine as FeO and not as $Fe_2O_3$. The reduction of water release $H_2$ and the hydrogen adds to the non-oxidizing atmosphere in the atomization chamber.

Optionally, an overcoat 73 may be applied over the topcoat 59, the former being an abradable coating comprising solid lubricants in an emulsion or polymer base. This overcoat permits the total thickness of the coating to present essentially zero clearance for the piston to bore wall fit.

The liner inserts 12 or 15 may be implanted by shrink fitting into a slightly undersized cylinder bore 11, or the liner inserts may be cast in place when the block is cast itself. To implant by casting in place, the liner inserts are prepared and coated as detailed earlier, and placed on cylinder bore cores in the mold. The liner inserts are heated prior to casting such as by induction heating, and the outer surface of the liners may be textured to affect greater locking between the molten metal and the liner outside diameter. The cylinder bore centers should be true to the final machined bore centers to within 100 microns, to thereby avoid the cost of applying excess coating.

If the implanting (see step 5 of FIG. 1) of the coated liners takes place by shrink fitting, the liners are cooled to a temperature of about −100° C. by use of isopropyl alcohol and dry ice. While the engine block is maintained at about ambient temperature, the frozen liners, along with their coatings, are placed into the bores 11 and allowed to heat up to room temperature whereby the outer surface of the bore wall comes into intimate interfering contact with the inserts as a result of expansion. Alternatively, the block could be heated to about 300° F. and the liner inserts, held at room temperature, dropped in place.

The tubing that is used to make the liners should have an outside diameter that is about 35 microns (±15 microns) in excess of the bore wall internal diameter of the engine block while they are both at ambient temperatures. It is advantageous to coat the exterior surface 46 of the liner inserts with a very thin coating of copper flake and a polymer, such coating 74 having a thickness of about 5 microns. Thus, when the liner is forced into interference fit with the aluminum block cylinder wall, a very superior thermally conductive bond therebetween takes place.

Optionally, the coated interior surface 47 may be plateau honed 75 (see step 6 of FIG. 1) in increments of about 100, 300, and 600 grit to bring the exposed coated surface to a predetermined surface finish. The liner inserts may protrude approximately 10 to 25 microns over the face surface of the block; such protrusion is machined 74 (deck facing) to a common plane required for sealing the engine gasket. A polymer based solid film lubricant overcoating 73 is applied by a brush or tool 76 onto a pre-honed surface (see step 7). If the total coating system is applied in a very thin thickness to a precision machined bore surface, then honing may not be necessary.

The common sized cylindrical bores 11 can be circular in cross-section as is conventional and as shown in FIG. 1. The design control is then focused in the extruded tubing wall thickness which will be uniformly thick and is selected from 1–15 mm; both the interior and exterior surfaces of such tubing would be circular in cross-section. This permits the change in cylinder volume displacement to be as much as 100% for a V-8 engine. To leverage such flexibility to an even high degree, the common sized cylindrical bores may be shaped in cross-section as an ovoid. Ovoid is defined herein to mean a shape comprising two half circles separated by essentially a rectangle bonded by essentially straight walls (see FIG. 11). The ovoid bore in the block may be cast to shape. The exterior or interior of the extruded tubing, if shaped as an ovoid, can be done by controlling the extrusion die. In some cases, the insert can have an exterior ovoid surface and a circular interior surface, but such interior surface can be selected from circular to an ovoid with small straight sides, to an ovoid with large straight sides, to an ovoid with large straight sides more complementary to the exterior surface.

To allow pistons to accommodate the ovoid shape, it may be necessary to use a piston ring assembly that will work with such shape. To this end, the piston and piston ring assembly is as shown in FIGS. 10, 12, 13A and 13B.

The piston assembly 80 provides for compression rings 81,82 matingly superimposed one upon another in a single stepped groove 83 with the split ends of each of the compression rings out of superimposed axial alignment. A conventional oil control ring 84 may be used in groove 85 spaced a distance from the single groove. The compression rings may be made of conventional iron or steel or lighter metals such as aluminum. The surfaces of the groove 83 as well as the non-mating surfaces of the pair of compression rings are coated with a solid film lubricant 86 in a coating thickness usually of about 10 microns or less. The groove is stepped at 87 into upper and lower spaces 80,89 with the upper space 88 having the greater groove depth. The step 87 may be formed with mutually perpendicular surfaces. The groove as a whole can have a much greater height than allowed by prior art grooves (the groove height has heretofore been dictated by the need to keep rings thin to control ring tension). The stepped groove of increased height can have an aspect ratio (depth to height) which is less than 10 and preferably less than 5. Each ring 81,82 resides essentially in a different one of the spaces with the uppermost ring 81 having its bottom surface 90 engageable with both the top surface 87A of the groove step and the top surface 91 of the lowermost ring 82. The uncoated mating surfaces 90 and 91 should have a coefficient of friction of 0.12–0.15 or more. A leak path #1 which would follow behind the rings and underneath either of the rings is closed off under all operating conditions. A leak path #2 which would follow between the outer circumference of the rings and the bore wall 11 is closed or becomes essentially zero clearance therebetween. A leak path #3 through the rings between the split ends thereof is reduced to a negligible amount because of the superimposed non-alignment.

The combined features operate to eliminate blow-by (through leak paths #1, #2 and #3) in this manner: the combustion gas pressure presses down on the top surface of the upper compression ring 81 forcing the pair of compression rings 81,82 to contact each other along their mating uncoated surfaces 90,91. The absence of oil between these mating surfaces and the normally high friction coefficient (i.e. 0.12–0.15) of such surfaces will ensure movement of the pair of rings as a unit or couple. During the compression and expansion strokes of the piston 92, the upper compression ring 81 will act as an effective seal. As the gas pressure increases during the upward movement of the piston during the compression stroke, a corresponding pressure increase occurs on the top surface of the upper compression ring 81 as well as against the radially inner surface 93 forcing the upper ring 81 to assist the inherent ring tension to make sufficient contact against the oil film of the bore wall 11. The lower compression ring 82 will move in tandem with the upper compression ring not only because of the friction between their mating surfaces but because the lower surface of the lower compression ring 82 is free to glide with little or no friction on the bottom surface of the groove due to the presence of the solid film lubricant coatings therealong. The unitized rings, being free to move laterally and exert tension against the oil film of the bore wall, also do so while sealing against the step 87 and the bottom of the groove). Leak path #1 is thus blocked. Blow-by will not occur between the inner contacting surfaces 90,91 of the compression rings and the bore wall because the rings are free to adjust radially with no sticking or friction. Thus leak path #2 is blocked.

Although the tension force of the lower compression ring is somewhat lower than that of the upper compression ring, the upper compression ring will be assisted by gas pressure to provide sufficient sealing resulting in little or no blow-by. Because of the rapid increase in gas pressure inside the top compression ring, it possesses improved sealing. The lower compression ring, is designed to be essentially an oil film scrapper (has barrel shaped outer edge contour) during the downward motion of the piston and contributes little or no friction.

As shown in FIG. 13A, the split end pairs 94,95 and 96–97 of the respective compression rings are out of superimposed alignment and may be referred to hereafter as being overlapped. Each pair of split ends is dovetailed (or overlapped) in a circumferential direction, that is, the split end pairs are not in superimposed alignment. This feature is important because of the tight union maintained between the upper and lower compression rings resulting from the force of gas pressure; the leakage path for combustion gases (to migrate through any gap or spacing between the split ends) is eliminated due to this dual overlapping condition. In FIG. 13B, the dovetailing construction creates overlapping tongues such as 98 and 99 contoured radially to have a notch creating a such tongues; the tongues are overlapped in a radial direction within a ring, but overlapped circumferentially between rings. Because the superimposed rings block any direct path through the rings, leak path #3 is again essentially eliminated.

Figure 9:
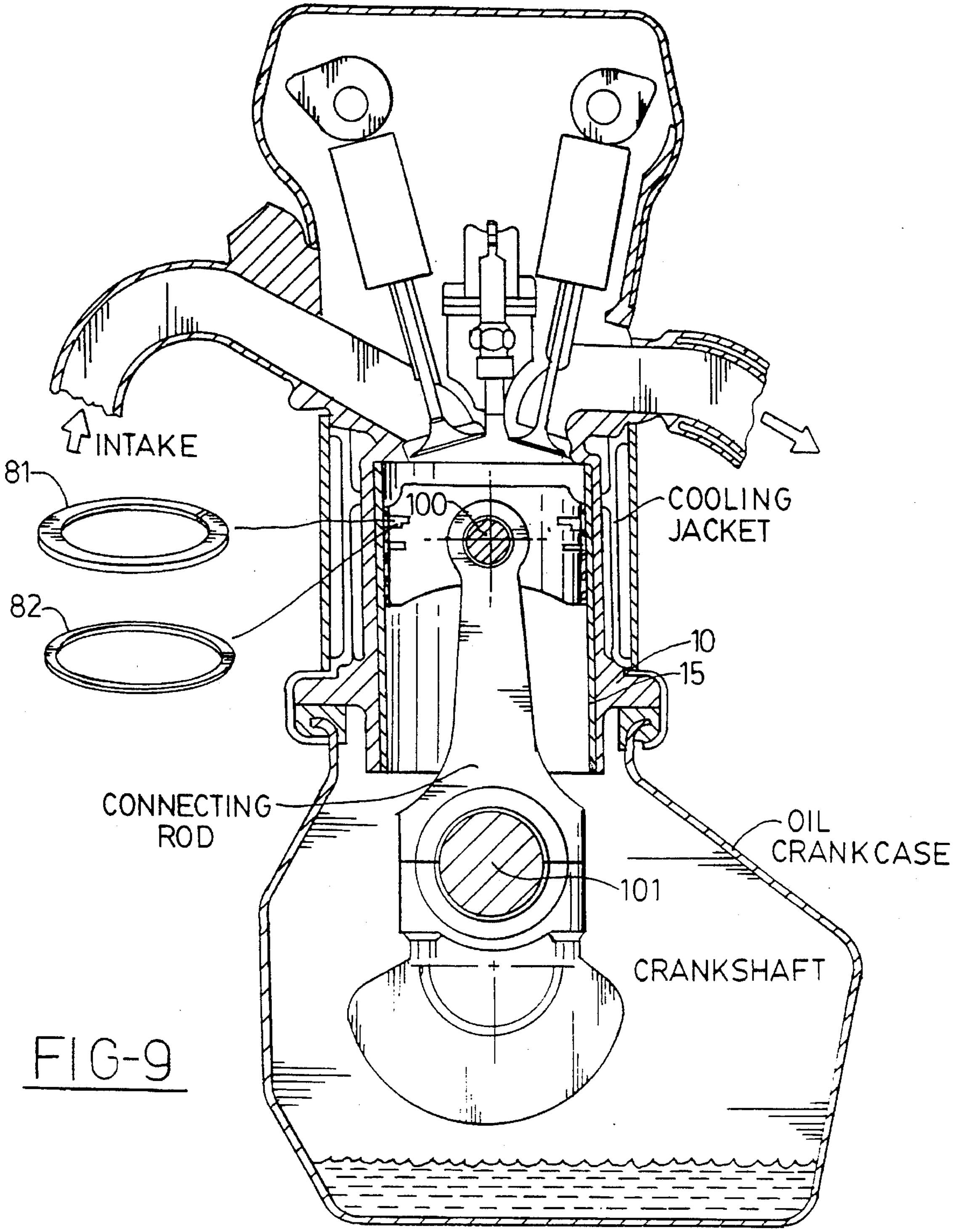
FIG. 9 is a sectional elevational view of an internal combustion engine showing one engine block having an ovoid cylindrically shaped bore wall and incorporating the liner insert principles of this invention.

When any ovoid interior surfaces are coated, honing must be controlled to assure concentricity of the coating on the curvilinear portions with the operating axes of the engine. Such operating axes (as shown in FIG. 9) include the crankshaft axis of revolution 100 and the connecting rod pin axis 101 (parallel to the crankshaft axis. It is important the honing axis be perpendicular to the crankshaft axis so that the minor axis of the ovoid will be parallel to axes 100 and 101. Irrespective of whether the fixed configuration block and head have circular cylindrical or ovoid cylindrical bores or chambers, volume displacement variation is achieved by liner wall thickness variation and/or interior cross-sectional shape. This will necessitate a change in piston cross-section to accommodate such variation in volumetric shape.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

We claim:

1. A method of flexibly making common sized engine blocks with differing volumetric displacements, comprising:

(a) making at least first and second engine blocks with commonly sized cylinder bore walls;

(b) preparing a set of first liner inserts for the first block from extruded tubing and a set of second liner inserts for the second liner inserts for the second block from other extruding tubing, each set of liner inserts having a different wall thickness resulting from selecting extruded tubing of a different wall thickness in the range of 1–15 mm;

(c) implanting the set of first liner inserts into the first block and the set of second liner inserts into the second block, said implanting being with a fit that promotes thermal conductivity across the face between said inserts and bore wall; and (d) applying an adherent anti-friction wear-resistant coating to at least a zone of the interior of each liner insert, said coating being controlled as to uniform thickness, concentricity, and trueness to the operating axes of said engine blocks, said coating being applied either prior to or subsequent to said implanting.

2. The method as in claim 1 in which the common sized engine blocks have identically shaped circular cylindrical bore walls and the selection of the wall thickness of said extruded tube correlating to a cylinder volume displacement change of as much as 100%.

3. The method as in claim 1 in which the common sized engine blocks have identically shaped ovoid cylindrical bore walls, said ovoid having the ratio of its major to its minor axis in the range of 1.0 to 1.35, the engine blocks having a crankshaft axis with the minor axis of said ovoid shape being essentially parallel to the plane of such crankshaft axis, the extruded tubing having an outer surface complementary to said ovoid shape and an interior surface the selection of which varies between a circular cylindrical shape to an ovoid shape, the wall thickness of said tubing at opposite ends of said minor axes is selected within the range of 1–15 mm, the design variation in the extruded tubing wall correlating to a cylinder volume displacement change of as much as 150%.

4. The method as in claim 1 in which in said implanting is carried out by one of (i) costing said liner inserts in place when making said block, or (ii) shrink fitting said liner inserts to create an interference fit with the bore wall.

5. The method as in claim 4 in which the coating is trued by microsizing and honing subsequent to implantation by casting-in-place, and trued only by honing if prior to implantation by shrink fitting.

6. The method as in claim 1 in which the composition of said coating is selected from the group of (i) oxided metal particles having a dry coefficient of friction of 0.2–0.35, (ii) non-oxided metal particles mixed or agglomerated with solid lubricant particles, and (iii) metal encapsulated solid lubricant particles.

7. The method as in claim 6 in which said metal is steel.

8. The method as in claim 6 in which said non-oxided metal of (ii) is stainless steel and said solid lubricant is BN mixed with Ni.

9. The method as in claim 1 in which said block and liner are each of aluminum base metal, the metal for said block having a hardness in the range of Ra 120–260, and the hardness for the metal of the liners being incrementally higher due to the cold working of the extruded tubing.

10. The method as in claim 1 in which said liner inserts have an extruded surface finish of about 50 micro inch.

* * * * *